(12) United States Patent
Alkov et al.

(10) Patent No.: US 9,900,273 B2
(45) Date of Patent: Feb. 20, 2018

(54) COORDINATED DEEP TAGGING OF MEDIA CONTENT WITH COMMUNITY CHAT POSTINGS

(71) Applicant: International Business Machines Corporation, Armonk, NY (US)

(72) Inventors: Christopher S. Alkov, Austin, TX (US); Travis M. Grigsby, Austin, TX (US); Ruthie D. Lyle, Durham, NC (US); Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/196,101

(22) Filed: Jun. 29, 2016

(65) Prior Publication Data

US 2016/0308802 A1    Oct. 20, 2016

Related U.S. Application Data

(63) Continuation of application No. 14/948,333, filed on Nov. 22, 2015, now Pat. No. 9,397,970, which is a
(Continued)

(51) Int. Cl.
| | |
|---|---|
| *G06F 15/16* | (2006.01) |
| *H04L 12/58* | (2006.01) |
| *H04L 29/08* | (2006.01) |
| *G06F 17/30* | (2006.01) |
| *G10L 15/18* | (2013.01) |
| *H04L 29/06* | (2006.01) |

(52) U.S. Cl.
CPC ...... *H04L 51/046* (2013.01); *G06F 17/30873* (2013.01); *G10L 15/1822* (2013.01);
(Continued)

(58) Field of Classification Search
CPC ... H04L 12/1831; H04L 51/046; H04L 51/16; H04L 51/32; H04L 67/22; H04L 12/1822;
(Continued)

(56) References Cited

U.S. PATENT DOCUMENTS

| | | |
|---|---|---|
| 6,393,460 B1 | 5/2002 | Gruen |
| 7,036,011 B2 | 4/2006 | Grimes et al. |

(Continued)

OTHER PUBLICATIONS

Ling et al. "Emotion detection using keywords spotting and semantic network IEEE ICOCI 2006" Computing & Informatics, 2006. ICOCI '06. 5 pages.*

(Continued)

*Primary Examiner* — David Lazaro
(74) *Attorney, Agent, or Firm* — Steven M. Greenberg, Esq.; CRGO Law

(57) ABSTRACT

Embodiments of the present invention address deficiencies of the art in respect to deep tagging of media content and provide a method, system and computer program product for coordinating deep tagging of media content with chat postings. In an embodiment of the invention, a method for coordinating deep tagging of media content with chat postings can be provided. The method can include monitoring a group chat of participants co-browsing media content, identifying a token in the group chat appearing a threshold number of times within a temporal window, and creating a deep tag in the media content in association with a portion of the media content played back concurrently with the temporal window.

13 Claims, 1 Drawing Sheet

Related U.S. Application Data continuation of application No. 11/967,151, filed on Dec. 29, 2007, now Pat. No. 9,224,390.

(52) U.S. Cl.
CPC .............. *H04L 51/16* (2013.01); *H04L 51/32* (2013.01); *H04L 65/607* (2013.01); *H04L 67/1097* (2013.01); *H04L 67/22* (2013.01)

(58) Field of Classification Search
CPC ......... G06F 17/30873; G06F 17/30817; G06F 17/30849; G10L 15/1822; G10L 15/1815
See application file for complete search history.

(56) References Cited

U.S. PATENT DOCUMENTS

| | | |
|---|---|---|
| 7,466,334 B1 | 12/2008 | Baba |
| 7,596,596 B2 | 9/2009 | Chen et al. |
| 2002/0188681 A1 | 12/2002 | Gruen et al. |
| 2004/0078431 A1 | 4/2004 | Ahn |
| 2005/0114131 A1 | 5/2005 | Stoimenov et al. |
| 2005/0235034 A1 | 10/2005 | Chen et al. |
| 2006/0263038 A1 | 11/2006 | Gilley |
| 2007/0055986 A1 | 3/2007 | Gilley et al. |
| 2007/0154190 A1 | 7/2007 | Gilley et al. |
| 2008/0066001 A1 | 3/2008 | Majors et al. |
| 2008/0187279 A1 | 8/2008 | Gilley et al. |
| 2008/0222283 A1 | 9/2008 | Ertugrul et al. |
| 2008/0228928 A1 | 9/2008 | Donelli et al. |
| 2009/0030984 A1 | 1/2009 | Chen et al. |
| 2009/0172150 A1 | 7/2009 | Alkov |
| 2010/0169786 A1 | 7/2010 | O'Brien et al. |

OTHER PUBLICATIONS

Yu et al. "Emotion Detection from Speech to Enrich Multimedia Content" LNCS, vol. 2195, Nov. 2001 8 pages.*

* cited by examiner

COORDINATED DEEP TAGGING OF MEDIA CONTENT WITH COMMUNITY CHAT POSTINGS

CROSS-REFERENCE TO RELATED APPLICATIONS

This application is a Continuation of U.S. patent application Ser. No. 14/948,333, filed Nov. 22, 2015, which is a Continuation of U.S. patent application Ser. No. 11/967,151, filed on Dec. 29, 2007, both of which are incorporated herein by reference in their entirety.

BACKGROUND OF THE INVENTION

Field of the Invention

The present invention relates to the field of content tagging in a computer communications network and more particularly to deep tagging of media content.

Description of the Related Art

Xanadu, the progenitor of the World Wide Web and the Internet intended upon a means for providing self-service distribution of content to interested parties across the globe. The World Wide Web (Web) as the successor to Xanadu, through its adoption of a standardized markup language and corresponding content browser specification, advanced the notion of content distribution to its present high efficient form. So effective was the Web in bringing content to the masses that an unwieldy volume of content rapidly published through the Web far ahead of any mechanism to locate and index desired content. The search engine eventually filled this void resulting in an effective way for users to seek out and view massive quantities of content on demand.

Content indexing associated with search engine technology relies upon an automated classification of content irrespective of the subjective perspective of the Web community. Second generation technologies address the socialization of content distribution about the Internet by personalizing the characterization and indexing of content. Indeed second generation technologies provide a wholly different way of indexing and locating content dependent upon the social relationships between end users. Exemplary second generation technologies include social networking portals, co-browsing environments, and social bookmarking systems.

Social bookmarking refers to the collective location and characterization of content of interest. In a social bookmarking system, different users can tag content of interest and the tags applied by the members of a social bookmarking community can be applied to content as it is distributed to other members. Indeed even the presentation of content that has been tagged can vary according to the volume of tags applied to the content by the members of the social bookmarking community. In all instances, however, a member of the social community must locate content of interest and apply a tag to the content of interest such that subsequent members viewing the content of interest can enjoy the context provided by the tag.

The notion of tagging initially had been associated with traditional Web content—namely Web pages. Tagging, however, has expanded its reach to include fully motion video and audio and other types of Web distributable content. In audio and video, specifically, deep tags can be applied to portions of media content such as audio or video so that an end user can skip to the deeply tagged portions during playback. Thus, deep tagging has become an organizational tool for Web distributable media content. Additionally, deep tagging provides socially acceptable context for members of a social network providing the deep tags. Still, applying deep tags to media content can be challenging as end users tediously must recall a desired portion of media content and navigate to that portion during playback in order to apply a deep tag.

BRIEF SUMMARY OF THE INVENTION

Embodiments of the present invention address deficiencies of the art in respect to deep tagging of media content and provide a novel and non-obvious method, system and computer program product for coordinating deep tagging of media content with chat postings. In an embodiment of the invention, a method for coordinating deep tagging of media content with chat postings can be provided. The method can include monitoring a group chat of participants co-browsing media content, identifying a token in the group chat appearing a threshold number of times within a temporal window, and creating a deep tag in the media content in association with a portion of the media content played back concurrently with the temporal window.

In one aspect of the embodiment, the method further can include tracking a number of participants contributing token, linking the number with the deep tag, and rendering a tag cloud for the deep tag in association with the portion of the media content according to the linked number. In another aspect of the embodiment, the method further can include filtering a set of tokens from the group chat relating to articles of speech such as a set of tokens from the group chat relating to undesirable speech such as foul language, sexually explicit language or offensive language.

In yet another aspect of the embodiment, the method further can include creating a broad tag in connection with the token when the token has been contributed a threshold number of times indicating widespread usage. In even yet another aspect of the embodiment, the method further can include displaying to each of the participants a listing of deep tags applied to a portion of the media content being played back to provide cues for word usage in the group chat. In a final aspect of the embodiment, the method further can include speech recognizing audibly detectable user reactions to the media content to produce the token mapped to the audibly detectable user reactions.

In another embodiment of the invention, a co-browsing data processing system can be provided. The system can include a media content server configured to stream media content such as video or audio (or both) to different clients over a computer communications network and a chat server configured to host a group chat amongst the clients. The system further can include social deep tagging logic. The logic can include program code enabled to monitor the group chat, to identify a token in the group chat appearing a threshold number of times within a temporal window, and to create a deep tag in the media content in association with a portion of the media content played back concurrently with the temporal window.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for coordinating deep tagging of media content with chat postings. In accordance with an embodiment of the present invention, members of a social network can co-browse media content, such as audio or video. A group chat can be established and maintained as between the members concurrently with co-browsing the media content. The postings of the group chat can be parsed to identify tokens used commonly and repeatedly amongst the members within a threshold span of time. Once a token such as a word or symbol has been used commonly by a threshold number of members within a threshold span of time, the commonly used token can be applied as a deep tag to the portion of the multimedia played back during the span of time. In this way, socially relevant context can be applied to the media content as a deep tag without requiring a tedious manual deep tagging of the media content.

Figure 1:
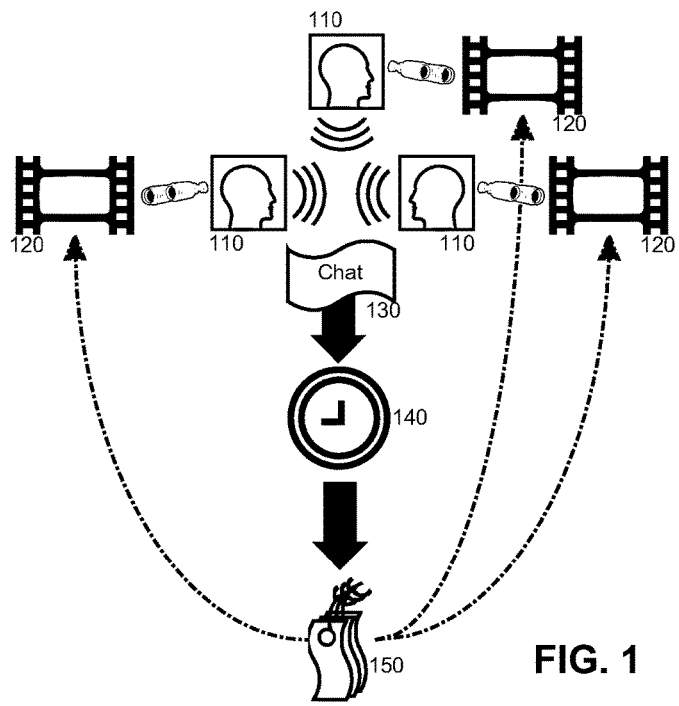
FIG. 1 is a pictorial illustration of a process for coordinating deep tagging of media content with chat postings.

In further illustration, FIG. 1 is a pictorial illustration of a process for coordinating deep tagging of multimedia content with chat postings. As shown in FIG. 1, multiple different collaborators 110 can concurrently browse media content 120, for example video or audio or both. Specifically, each of the different collaborators 110 can view the playback of the same media content 120 at substantially the same time, hereinafter referred to as co-browsing the media content 120. Concurrently, the collaborators 110 can engage in a group chat 130. During a window of time 140, the words and symbols appearing in the group chat 130 can be analyzed to identify a token provided by multiple different ones of the collaborators 110 during the window of time 140. In response, a deep tag 150 with the identified token can be applied to the portion of the media content 120 played back at the time of the identification.

Figure 2:
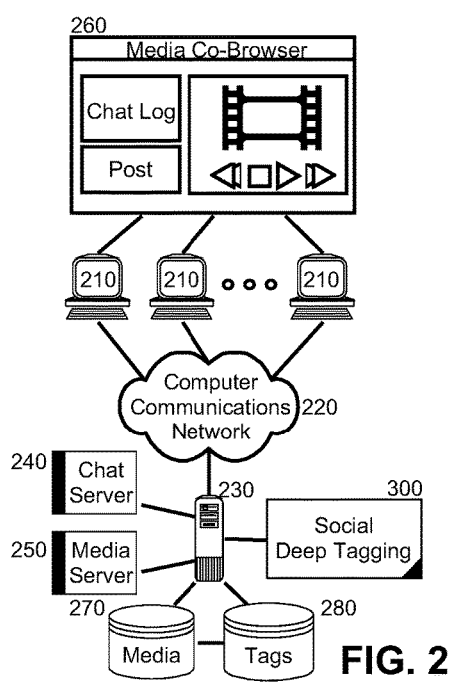
FIG. 2 is a schematic illustration of a multimedia co-browsing data processing system configured for coordinating deep tagging of media content with chat postings; and, FIG. 3 is a flow chart illustrating a process for coordinating deep tagging of media content with chat postings.

The process of FIG. 1 can be embodied within a media co-browsing data processing system. In further illustration, FIG. 2 is a schematic illustration of a media content co-browsing data processing system configured for coordinating deep tagging of multimedia content with chat postings. The system can include multiple different clients 210 communicatively coupled to a host server 230 over computer communications network 220. The host server 230 can be coupled to both a chat server 240 and also a media server 250 streaming media content 270 to the different clients 210 over the computer communications network 220 for viewing in a media co-browser 260 executing in each of the clients 210 (only a single media co-browser 260 shown for the purpose of illustrative simplicity).

Social deep tagging logic 300 can be coupled to each of the chat server 240 and the media server 250 through host server 230 and further to a data store of deep tags 280 applied to portions of the media content 270. The social deep tagging logic 300 can include program code enabled to detect commonly used tokens in a group chat within a threshold window of time. Alternatively, the social deep tagging logic 300 can include program code enabled to detect common emotions provided by biometric monitoring systems in each of the clients 210. The program code of the social deep tagging logic 300 further can be enabled to create a deep tag in the data store of deep tags 280 for concurrently played back portions of the media content 270 using the commonly used tokens from the group chat appearing within the threshold window of time during the concurrent playback of the media content 270. In this way, socially relevant deep tags can be automatically applied to portions of the media content 270 without requiring a tedious manual application of the deep tags.

Figure 3:
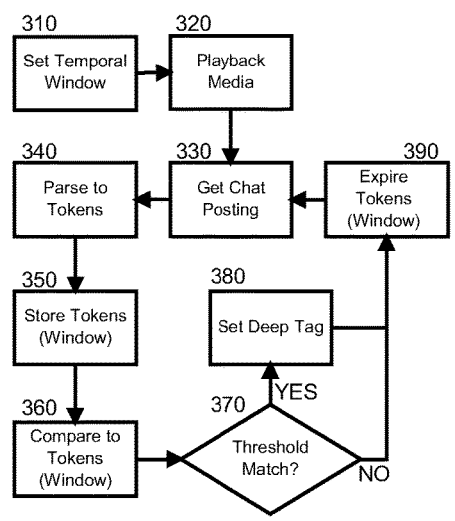

In yet further illustration of the operation of the social deep tagging logic 300, FIG. 3 is a flow chart illustrating a process for coordinating deep tagging of multimedia content with chat postings. Beginning in block 310, a temporal window of time can be established such as a few seconds or a few minutes. In block 320, media content, such as audio or video, can be played back for viewing within media browsers in multiple different clients over a computer communications network. Concurrently, a group chat can be established in the different clients, either as part of a co-browser application or as a separate application and in block 330, the chat postings from the different clients can be received for processing.

In block 340, a chat posting can be parsed into a sequence of tokens and in block 350, the tokens can be stored in association with a time stamp. In block 360, the stored tokens can be compared to other stored tokens to identify those of the tokens which have been included as part of postings by a threshold number of the clients during the established temporal window. In decision block 370, it can be determined if any of the tokens match. Alternatively, it can be determined if any of the tokens pre-determined to be "similar" or "analogous" as specified in a table. If so, in block 380 a deep tag can be created with the matching token for a portion of the media content played back during the temporal window. In either case, however, in block 390 those of the stored tokens that have fallen out of the temporal window can be expired and purged from storage so that only tokens contributed during the temporal window remain. Thereafter, the process can repeat for a next chat posting in block 330.

Notably, in one aspect of the embodiment, the number of clients contributing the same token can be tracked and associated with the deep tag so that when rendered, a tag cloud can be provided. In another aspect of the embodiment, a set of token filters can be provided to filter out certain articles unlikely to relate to the media content, as well as undesirable tokens such as foul language or explicit or offensive words. In yet another aspect of the embodiment, when a token has been contributed a threshold number of times indicating widespread usage, a broad tag instead of a deep tag can be generated. In even yet another aspect of the embodiment, a listing of the deep tags applied to a portion of media content being played back can be displayed to the collaborators to provide cues for word usage in the group chat. In a final aspect of the embodiment, speech recognized tokens can be provided for audibly detectable user reactions such as laughter or gasping. In particular, the detected user reactions can be mapped to a preset token such as "funny" or "scary".

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for coordinating deep tagging of media content with chat postings, the method comprising:
monitoring a group chat of participants co-browsing media content;
speech recognizing audibly detectable user reactions to the media content to produce different tokens for each of the user reactions;
determining that one of the produced different tokens in the group chat appears a threshold number of times within a temporal window; and,
creating a deep tag in the media content for a common emotion expressed by the participants in correspondence with the determined one of the produced different tokens in association with a portion of the media content played back concurrently with the temporal window.

2. The method of claim 1, further comprising:
tracking a number of participants contributing the determined one of the produced different tokens;
linking the number with the deep tag; and,
rendering a tag cloud for the deep tag in association with the portion of the media content according to the linked number.

3. The method of claim 1, further comprising creating a broad tag in connection with the determined one of the produced different tokens when the determined one of the produced different tokens has been contributed a threshold number of times indicating widespread usage.

4. The method of claim 1, further comprising displaying to each of the participants a listing of deep tags applied to a portion of the media content being played back to provide cues for word usage in the group chat.

5. The method of claim 1, wherein determining that one of the produced different tokens in the group chat appears a threshold number of times within a temporal window, comprises determining that similar ones of the produced different tokens in the group chat appears a threshold number of times within a temporal window.

6. A co-browsing data processing system comprising:
a media content server configured to stream media content to different clients over a computer communications network;
a chat server configured to host a group chat amongst the clients; and,
social deep tagging logic comprising program code enabled to monitor the group chat, to speech recognize audibly detectable user reactions to the media content to produce different tokens for each of the user reactions, to determine that one of the produced different tokens in the group chat appears a threshold number of times within a temporal window, and to create a deep tag in the media content for a common emotion expressed by the participants in correspondence with the determined one of the produced different tokens in association with a portion of the media content played back concurrently with the temporal window.

7. The system of claim 6, wherein the media content is audio.

8. The system of claim 6, wherein the media content is video.

9. A computer program product comprising a computer usable storage device storing computer usable program code for coordinating deep tagging of media content with chat postings, the computer program product comprising:
computer usable program code for monitoring a group chat of participants co-browsing media content;
computer usable program code for speech recognizing audibly detectable user reactions to the media content to produce different tokens for each of the user reactions;
computer usable program code for determining that one of the produced different tokens in the group chat appears a threshold number of times within a temporal window; and,
computer usable program code for creating a deep tag in the media content for a common emotion expressed by the participants in correspondence with the determined one of the produced different tokens in association with a portion of the media content played back concurrently with the temporal window.

10. The computer program product of claim 9, further comprising:

computer usable program code for tracking a number of participants contributing the determined one of the produced different tokens;

computer usable program code for linking the number with the deep tag; and, computer usable program code for rendering a tag cloud for the deep tag in association with the portion of the media content according to the linked number.

11. The computer program product of claim 9, further comprising computer usable program code for creating a broad tag in connection with the determined one of the produced different tokens when the determined one of the produced different tokens has been contributed a threshold number of times indicating widespread usage.

12. The computer program product of claim 9, further comprising computer usable program code for displaying to each of the participants a listing of deep tags applied to a portion of the media content being played back to provide cues for word usage in the group chat.

13. The computer program product of claim 9, wherein the computer usable program code for determining that one of the produced different tokens in the group chat appears a threshold number of times within a temporal window, comprises computer usable program code for determining that similar ones of the produced different tokens in the group chat appears a threshold number of times within a temporal window.

* * * * *